US007464036B1

(12) United States Patent  (10) Patent No.:  US 7,464,036 B1
Witte et al.  (45) Date of Patent:  Dec. 9, 2008

(54) METHODS, SYSTEMS, AND COMPUTER PROGRAM PRODUCTS FOR SELECTING A JOB POST SITE TO WHICH A JOB OPENING DESCRIPTION MAY BE POSTED BY RANKING JOB POST SITES BASED ON ONE OR MORE SELECTION CRITERION

(75) Inventors: Curt J. Witte, Raleigh, NC (US); James A. Grundner, Cary, NC (US); Basil Evrenidis, Raleigh, NC (US)

(73) Assignee: Peopleclick, Inc., Raleigh, NC (US)

( * ) Notice: Subject to any disclaimer, the term of this patent is extended or adjusted under 35 U.S.C. 154(b) by 1848 days.

(21) Appl. No.: 09/677,993

(22) Filed: Oct. 3, 2000

(51) Int. Cl.
*G06Q 10/00*  (2006.01)
(52) U.S. Cl. ............................................. 705/1; 705/10
(58) Field of Classification Search ................. 705/11, 705/10, 1; 706/45, 47
See application file for complete search history.

(56) References Cited

U.S. PATENT DOCUMENTS

| 4,910,660 | A | * | 3/1990 | Li ................................. 700/47 |
| 5,978,768 | A |   | 11/1999 | McGovern et al. ............. 705/1 |
| 5,999,939 | A |   | 12/1999 | de Hilster et al. ........... 707/102 |
| 6,363,384 | B1 | * | 3/2002 | Cookmeyer et al. ........... 707/10 |
| 6,546,393 | B1 | * | 4/2003 | Khan ........................... 707/10 |
| 6,681,223 | B1 | * | 1/2004 | Sundaresan .................... 707/6 |

OTHER PUBLICATIONS

Business/Technology Editors, Webhire Links Corporate Recruiting Desktops to Over 2,000 Job Posting Sites, Business Wire, New York, Mar. 2, 2000 [Proquest].*
Business/Technology Editors, Deploy Solutions Offers Customer Choice With the General Availability to Employ!, Business Wire, Jun. 12, 2000, [Dialog: file 16].*
Borck, Recruiting Systems Control Resume Chaos, InfoWorld, Jul. 24, 2000 [Proquest].*
Feldman, Find What I Mean, Not What I Say, Online: Publisher: Wilton, vol. 24, No. 3, May/Jun. 2000, p. 49-56 [STN].*

(Continued)

*Primary Examiner*—Susanna M Diaz
(74) *Attorney, Agent, or Firm*—Myers Bigel Sibley & Sajovec, P.A.

(57) ABSTRACT

Embodiments of methods, systems, and computer program products are provided that may facilitate selection of a job post site to which a job opening description may be posted. For example, a job post site may be selected by obtaining one or more job post site selection criterion. Multiple job post sites may then be ranked based on the selection criterion that has been obtained. Finally, the job post site may be selected based on the ranking of the multiple job post sites. Accordingly, an employer may define a job post site selection criterion that correlates with a specific type of job opening to select a job post site that may be more effective than other job post sites in recruiting employees for that specific type of job opening.

18 Claims, 8 Drawing Sheets

OTHER PUBLICATIONS

Microsoft Press, Computer Dictionary, Third Edition, 1997, p. 248.*
Callan et al. "Searching Distributed Collections With Inference Networks." Annual ACM Conference on Research and Development in Information Retrieval: Proceedings of the 18th Annual International ACM SIGIR Conference on Research and Development in Information Retrieval. pp. 21-28, 1995.*
Qureshi et al. "Artificial Intelligence in Accounting and Business." National Public Accountant, vol. 43, No. 7, pp. 13-18, Sep. 1998.*

* cited by examiner

METHODS, SYSTEMS, AND COMPUTER PROGRAM PRODUCTS FOR SELECTING A JOB POST SITE TO WHICH A JOB OPENING DESCRIPTION MAY BE POSTED BY RANKING JOB POST SITES BASED ON ONE OR MORE SELECTION CRITERION

BACKGROUND OF THE INVENTION

The present invention relates generally to the field of automated employment recruiting, and, more particularly, to selecting a job post site to which a job opening description may be posted.

Traditionally, when employers have sought new employees to fill open job positions, an employment manager or human resources coordinator may have posted an advertisement describing the open positions in a local newspaper, an appropriate trade journal, and/or in a school placement office. The information superhighway, however, may provide additional avenues for advertising job openings and for recruiting personnel. For example, traditional recruiting sources, such as newspapers, trade journals, and schools, may offer sites on the World Wide Web for employers to advertise their job openings. Moreover, career services companies, such as HotJobs.com, Ltd., Monster.com, CareerMosaic, etc., may provide electronic bulletin boards on which job openings may be posted by category and accessed throughout the world over the Internet.

In view of the potentially large number of job post sites available to employers to advertise their open job positions, an employment manager or human resources coordinator may have difficulty in determining which sites to use to enhance their effectiveness in recruiting employees. For example, for a first type of job opening, an employer may find that a local or regional newspaper may be the best job post site for recruiting potential candidates for the first type of open position. An employer may also find, however, that for a second type of job opening, an electronic bulletin board accessible via the Internet may be the best job post site for recruiting potential candidates for the second type of open position. Further complicating the recruiting process, the various job post sites may request that employers submit their job opening descriptions in a particular format, which may differ from site to site.

Consequently, there exists a need for improvements in how a job post site may be selected for advertising a job opening and in how a job opening description may be posted to a selected job post site.

SUMMARY OF THE INVENTION

Embodiments of the present invention may include methods, systems, and computer program products that may facilitate selection of a job post site to which a job opening description may be posted. For example, a job post site may be selected by obtaining one or more job post site selection criterion. Multiple job post sites may then be ranked based on the selection criterion that has been obtained. Finally, the job post site may be selected based on the ranking of the multiple job post sites. Advantageously, an employer may define a job post site selection criterion that correlates with a specific type of job opening to select a job post site that may be more effective than other job post sites in recruiting employees for that specific type of job opening.

In particular embodiments of the present invention, the multiple job post sites may be ranked by accessing a fact table that contains data that is relevant to the one or more job post site selection criterion and then using an inference engine to process the fact table and the job post site selection criterion to generate the ranking.

In further embodiments of the present invention, the job post site selection criterion may include a geographic location criterion, a skill set criterion, and a job post site performance criterion. The geographic location criterion may specify the desired coverage for the job post site. That is, whether the job post site serves a local, statewide, regional, national, or worldwide audience. The skill set criterion may be based on such criterion as education, experience, specific workplace skills, knowledge, etc. The job post site performance criterion may be indicative of a value of a job post site in acting as a source for candidates. This value may be based on the number of qualified candidates typically obtained through the job post site, the cost of advertising job openings on the job post site, the retention rate for candidates hired through the job post site, and/or combinations of these or other factors.

In still further embodiments of the present invention, those job post sites that satisfy the geographic location criterion may be identified. The job post sites identified based on the geographic location criterion may then be ranked based on the job post site performance criterion to generate a list of job post sites that are ranked by performance and also satisfy the geographic location criterion (geographic location list). Similarly, those job post sites that satisfy the skill set criterion may also be identified. The job post sites identified based on the skill set criterion may then be ranked based on the job post site performance criterion to generate a list of job post sites that are ranked by performance and also satisfy the skill set criterion (skill set list).

In other embodiments of the present invention, a geographic location fact table that contains data relevant to the geographic location criterion and a job post site performance fact table that contains data relevant to the job post site performance criterion may be processed by an inference engine to identify those job post sites that satisfy the geographic location criterion and then to rank the job post sites that satisfy the geographic location criterion based on the job site performance criterion. Similarly, a skill set fact table that contains data relevant to the skill set criterion and a job post site performance fact table that contains data relevant to the job post site performance criterion may be processed by an inference engine to identify those job post sites that satisfy the skill set criterion and then to rank the job post sites that satisfy the skill set criterion based on the job site performance criterion.

In still other embodiments of the present invention, the geographic location list and the skill set list may be combined into one ranked list of job post sites that takes into account the geographic location criterion, the skill set criterion, and the job post site performance criterion. For example, weights may be assigned to the rankings of the job post sites in the geographic location list and the skill set list based on the relative importance of the geographic location criterion versus the skill set criterion. Each job post site may then receive a composite rank based on a computed average of the job post site's rank in the geographic location list and the job post site's rank in the skill set list. Alternatively, the composite rank may be generated by computing a weighted average of the job post site's rank in the geographic location list and the job post site's rank in the skill set list if an employer or end user places greater value in one job post site selection criterion over another.

Alternative embodiments of the present invention may facilitate posting a job opening description to a job post site. In particular, one or more job post site selection criterion may be obtained by, for example, parsing a job opening description. Multiple job post sites may then be ranked based on the selection criterion that has been obtained. One or more job post sites may be selected based on the ranking of the multiple job post sites and the job opening description may be posted to the selected job post site(s). By obtaining one or more job post site selection criterion from the job opening description, those job post sites that may be more effective in recruiting employees for the particular job opening may be identified and unnecessary posts of the job opening description to less effective job post sites may be avoided.

In particular embodiments of the present invention, the job opening description may be an extensible markup language (XML) data stream. In addition, ranking of the job post sites may be performed in accordance with the various embodiments discussed in the foregoing.

In further embodiments of the present invention, the ranked job post sites may be displayed to an end user, thereby allowing the end user to select one or more job post sites to which the job opening description is to be posted. Alternatively, the job opening description may be posted to all job post sites that satisfy the one or more job post site selection criterion and/or a ranking threshold.

In yet other embodiments of the present invention, the job opening description may be converted into a format that is compatible with a job post site before the job opening description is sent to the job post site for posting.

Thus, the present invention may be used to assist an employer in selecting one or more job post sites to which the employer may choose to post a job opening description by ranking potential job post sites based on one or more predetermined criterion, such as skill set information and/or geographic location information. Furthermore, the present invention may also be used to assist an employer in submitting a job opening description to one or more job post sites by allowing the employer to review a ranked list of job post sites and to select those job post sites to which the job opening description is to be submitted. Alternatively, the present invention may automatically submit the job opening description to all job post sites that satisfy the one or more predetermined job post selection criterion and/or a ranking threshold. Before submitting a job opening description to a job post site, however, the present invention may convert the job opening description into a format that is compatible with that job post site. As a result, the present invention may obviate the need of an employer to keep track of the different formatting standards that may be used by various job post sites.

While the present invention has been described above primarily with respect to method aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
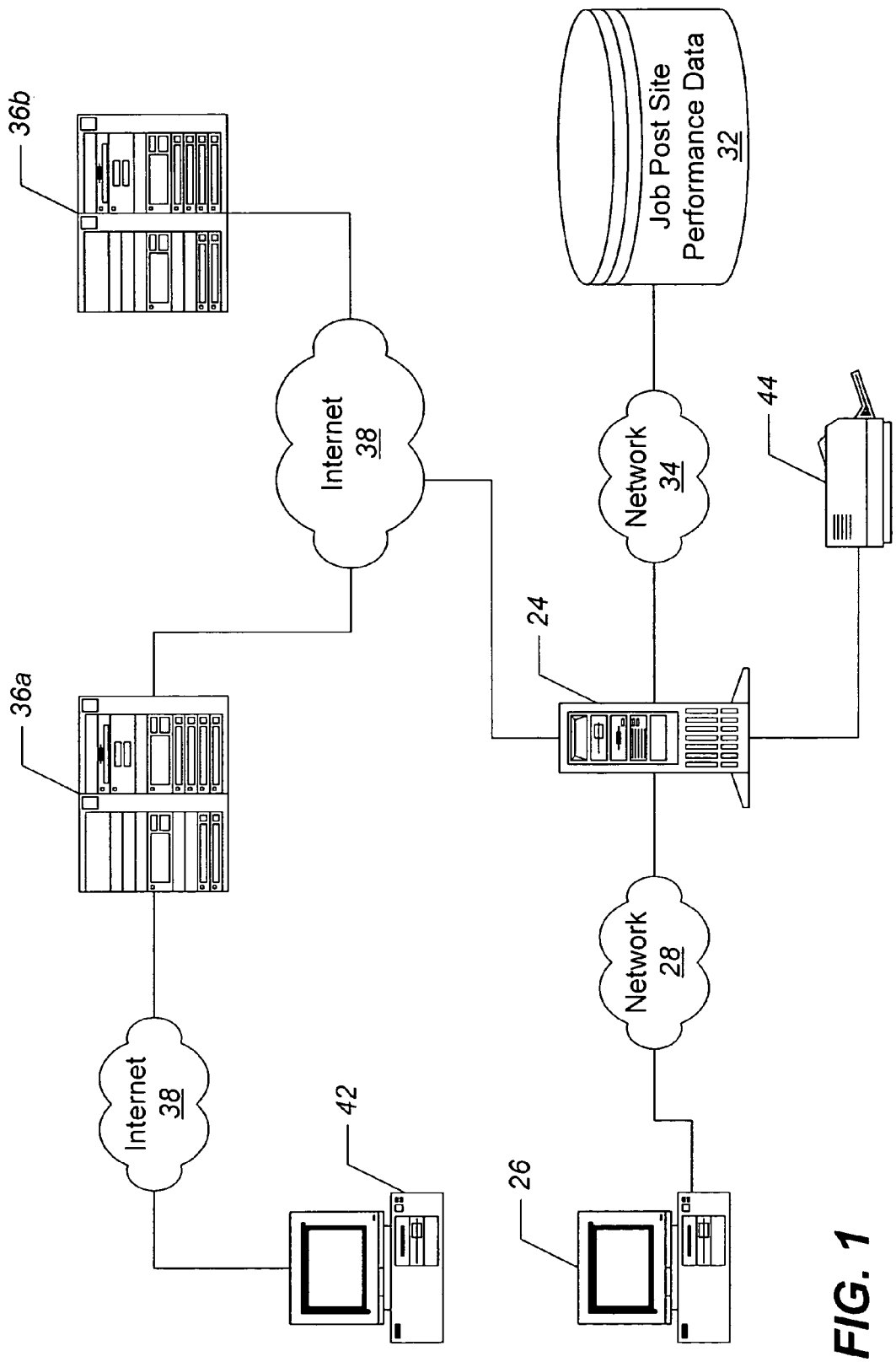
FIG. 1 is a block diagram that illustrates communication network architectures that facilitate posting of a job opening description to one or more job post sites in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary communication system network architecture in accordance with the present invention includes a data processing system 24 that is coupled to one or more computers 26 over a network 28. The computer 26 represents an end user or client system on which a job opening description may be generated. For example, a hiring manager in a small business or a human resources executive in a large business may generate one or more job opening descriptions on the computer 26, which may then be transferred to the data processing system 24 over network 28. Accordingly, network 28 may represent a global network, such as the Internet, or other network accessible by the general public. Alternatively, network 28 may represent a wide area network, a local area network, an Intranet, or other private network, which is not accessible by the general public. Furthermore, network 28 may represent a combination of public and private networks or a virtual private network (VPN).

The data processing system 24 may be configured with computational, storage, and control program resources for selecting a job post site and/or posting a job opening description to a job post site in accordance with the present invention. Thus, the data processing system 24 may be implemented as a single processor system, a multi-processor system, or even a network of stand-alone computer systems. The data processing system 24 may communicate with a job post site performance data repository 32 over a network 34 to obtain performance information regarding various job post sites that may be used in selecting a job post site and/or posting a job opening description to a job post site. Similar to network 28, network 34 may represent a global network, such as the Internet, or other network accessible by the general public. Alternatively, network 34 may represent a wide area network, a local area network, an Intranet, or other private network, which is not accessible by the general public. Furthermore, network 34 may represent a combination of public and private networks or a virtual private network (VPN). The network 34 may be optional, however, as the job post site performance data repository 32 may be configured to reside on the data processing system 24.

The data processing system 24 may communicate with job post sites 36a and 36b over the Internet 38. It will be understood that a private network or a combination of public and private networks may also be used to interconnect the data processing system 24 to one or more job post sites 36a,b.

Typically, however, the owner of the data processing system 24 and the owners of the job post sites 36a,b are unaffiliated; therefore, communication between the data processing system 24 and the job post sites 36a,b is generally performed over a public network, such as the Internet. In accordance with the present invention, a job post site may be any entity to which a job opening description may be communicated. Accordingly, the designation "job post site" may include, but is not limited to, newspaper publishers, trade journal publishers, magazine publishers, school placement offices, career services organizations, such as HotJobs.com, Ltd., Monster.com, CareerMosaic, etc., executive recruiting organizations, temporary employment agencies, etc. As shown in FIG. 1, job post sites 36a and 36b are accessible via the Internet 38 and may, therefore, electronically receive job opening descriptions for posting from the data processing system 24. In addition, job post site 36a may allow individuals seeking employment to view the posted job opening descriptions over the Internet 38 using, for example, a Web browser running on a computer 42. In contrast, job post site 36b does not provide electronic access to the job opening descriptions contained thereon, but instead may publish the job opening descriptions using print media. Finally, for those job post sites that are not accessible electronically or do not accept electronic job opening descriptions for posting, the data processing system 24 may print the job opening descriptions on a printer 44 for transmittal to such job post sites.

While FIG. 1 illustrates an exemplary communication system network architecture that may facilitate posting of a job opening description to one or more job post sites, it will be understood that the present invention is not limited to such a configuration but is intended to encompass any configuration capable of carrying out the operations described herein.

Figure 2:
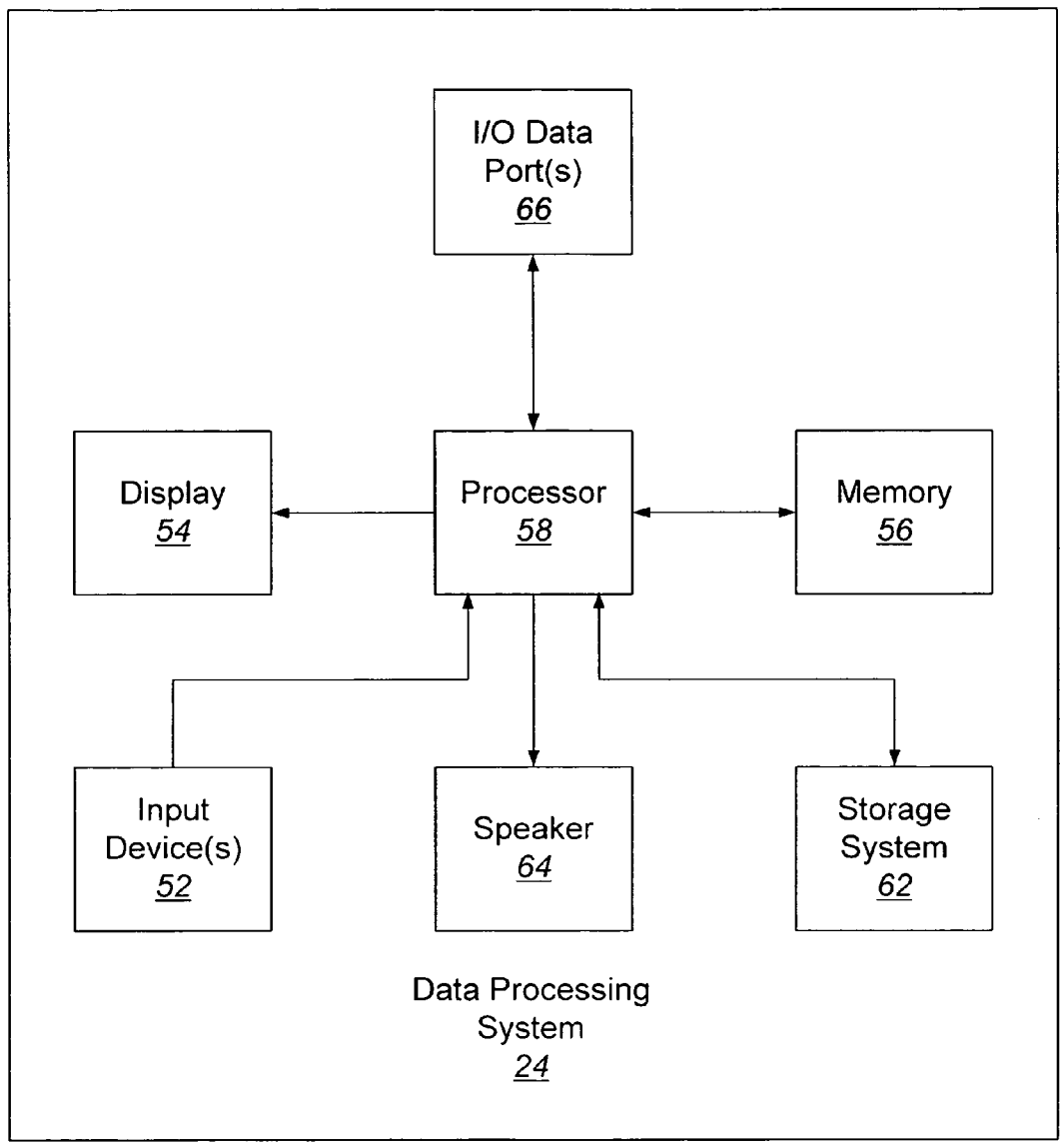
FIG. 2 is a block diagram that illustrates data processing systems in accordance with embodiments of the present invention.

With reference to FIG. 2, embodiments of the data processing system 24 may include input device(s) 52, such as a keyboard or keypad, a display 54, and a memory 56 that communicate with a processor 58. The data processing system 24 may further include a storage system 62, a speaker 64, and an input/output (I/O) data port(s) 66 that also communicate with the processor 58. The storage system 62 may include removable and/or fixed media, such as floppy disks, ZIP drives, hard disks, or the like, as well as virtual storage, such as a RAMDISK. The I/O data port(s) 66 may be used to transfer information between the data processing system 24 and another computer system or a network (e.g., the Internet). These components may be conventional components such as those used in many conventional computing devices, which may be configured to operate as described herein.

Figure 3:
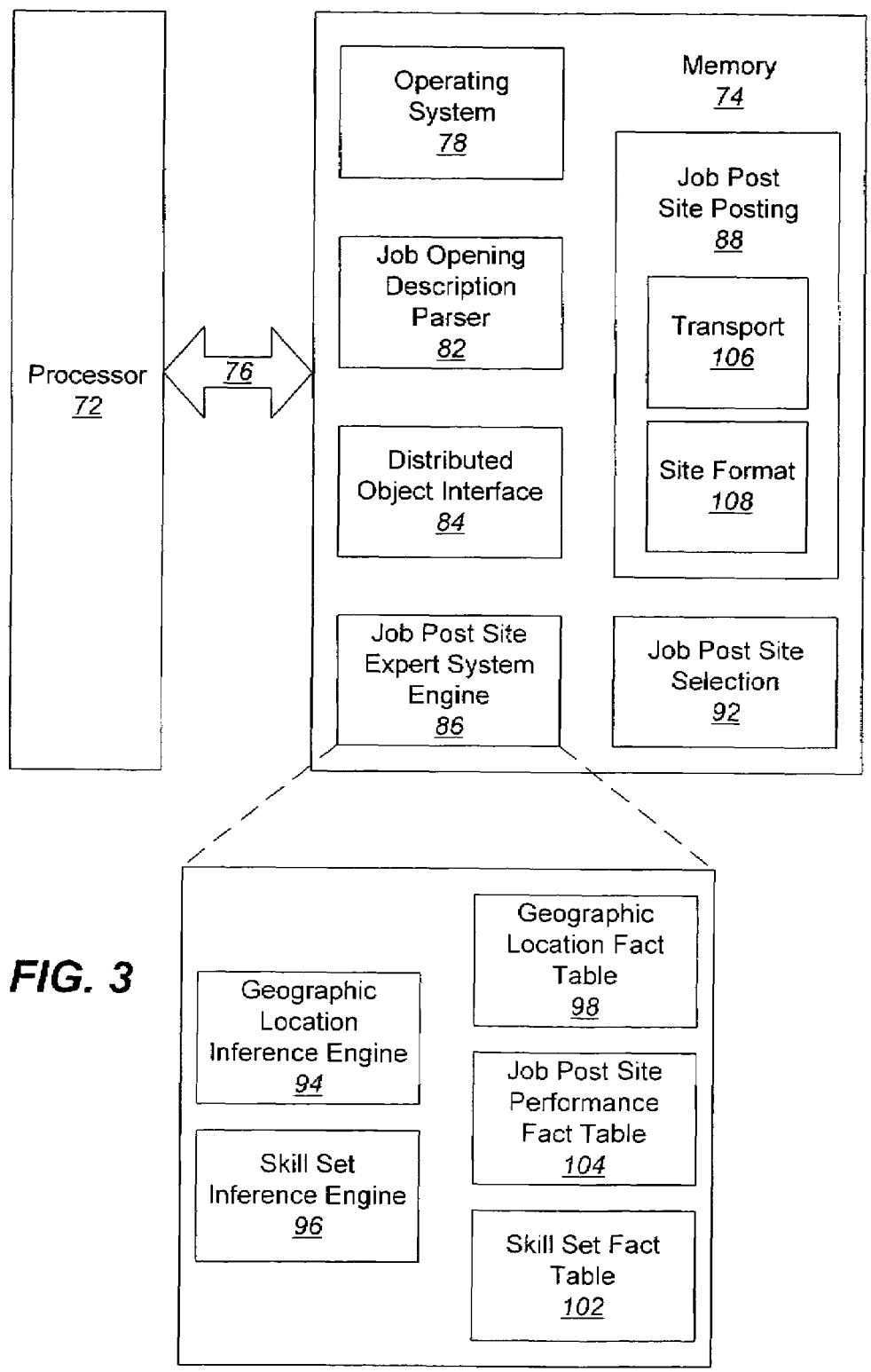
FIG. 3 is a block diagram that illustrates methods, systems, and computer program products for selecting a job post site and/or posting a job opening description to a job post site in accordance with embodiments of the present invention.

FIG. 3 illustrates a processor 72 and a memory 74, that may be used in embodiments of methods, systems, and computer program products for selecting a job post site and/or posting a job opening description to a job post site in accordance with embodiments of the present invention. The processor 72 communicates with the memory 74 via an address/data bus 76. The processor 72 may be, for example, a commercially available or custom microprocessor. The memory 74 is representative of the overall hierarchy of memory devices containing the software and data used to select a job post site and/or post a job opening description to a job post site in accordance with the present invention. The memory 74 may include, but is not limited to, the following types of devices: cache, ROM, PROM, EPROM, EEPROM, flash, SRAM, and DRAM.

As shown in FIG. 3, the memory 74 may hold six major categories of software and data: an operating system 78; a job opening description parser program module 82; a distributed object interface program module 84; a job post site expert system engine program module 86; a job post site posting program module 88; and a job post site selection program module 92. The operating system 78 controls the operation of the data processing system. In particular, the operating system 78 may manage the data processing system's resources and may coordinate execution of programs by the processor 72.

The job opening description parser module 82 may be configured to electronically parse a job opening description received, for example, from an employer. In an exemplary embodiment, an employer may encode a job opening description as an Extensible Markup Language (XML) data stream. XML is based on the Standard Generalized Markup Language (SGML), which is designed to facilitate the interchange of structured documents over the Internet. In XML files, the start and end of each logical part or element may be marked. The job opening description parser module 82 may use the demarcations between elements to parse and extract data from a job opening description for further processing.

The distributed object interface module 84 may be configured to allow the software modules in the memory 74 to be implemented as an object-oriented system that has objects distributed across a heterogeneous network. For example, the objects may be distributed across different data processing systems in a network and yet appear to each other as if they were local. In a distributed object-oriented computer system, client objects may be given object handles to reference remote server objects. A remote object is an object whose class is implemented in a process that is different from the process in which the object handle resides. Moreover, a remote object may be implemented on a data processing system that is remote from the data processing system on which the object handle resides. An object handle identifies a remote, server object and may allow a client object to invoke member functions of the remote object. Three exemplary distributed object models are the Distributed Component Object Model (DCOM), the Common Object Request Broker Architecture (CORBA) model, and the Java Remote Method Invocation (RMI) model. These three models are briefly discussed hereafter.

The DCOM model uses a protocol called Object Remote Procedure Call (ORPC) to support remote objects. A DCOM server object can support multiple interfaces with each interface representing a different behavior of the object. In general, an interface is a set of functionally related methods. A DCOM client object may acquire a pointer to one of a DCOM server object's interfaces and may invoke methods through that pointer as if the server object resided in the DCOM client object's address space. Resources for developing distributed software using DCOM may be obtained from Microsoft Corporation, One Microsoft Way, Redmond, Wash. 98052.

The CORBA model is based on an Object Request Broker (ORB) that acts as an object bus over which objects may transparently interact with one another irrespective of whether they are located locally or remotely. A CORBA server object supports an interface that consists of a set of methods. A particular instance of a CORBA server object is identified by an object reference. The object reference may be used by a CORBA client object to make method calls to the CORBA server object as if the CORBA client object and the CORBA server object shared the same address space. Resources for developing distributed software using CORBA may be obtained from the Object Management Group, 250 First Avenue, Needham, Mass. 02494.

The Java RMI model is specific to the Java programming language and relies on a protocol called Java Remote Method Protocol (JRMP). A Java RMI server object supports an interface that can be used by a Java RMI client object running on a different Java Virtual Machine (JVM) than the Java RMI server object to access Java RMI server object methods. In particular, a naming mechanism called RMI Registry is implemented that contains information about the Java RMI server objects and runs on the server JVM. A Java RMI client may acquire a reference to a Java RMI server object by doing a lookup in the RMIRegistry. The Java RMI server object reference may then be used by the Java RMI client object to invoke Java RMI server object methods as if the Java RMI client and server objects resided on the same JVM. Resources for developing distributed software using Java RMI may be obtained from Sun Microsystems, Inc., 901 San Antonio Road, Palo Alto, Calif. 94303.

The job post site expert system engine module 86 may be configured to embody an expert system that may be used to identify job post sites that satisfy one or more job post site selection criterion and to rank those identified job post sites. A brief overview of expert systems may be helpful to provide context for the following discussion of embodiments of the present invention. Expert systems may be defined as programs that emulate human expertise or logic in certain predefined problem domains. One commonly used technique that may be used in expert systems is known as rule-based programming. In this programming model, rules are used to specify an action or set of actions that are to be performed in a given situation. A rule may comprise an "if" portion and a "then" portion. The "if" portion of a rule may be implemented as a series of fact pattern(s) that cause the rule to be applicable. The expert system may use an "inference engine" to match the fact patterns in the rules against input data to determine which rules are applicable for a given situation. If the inference engine determines that a particular rule is applicable, then the actions comprising the "then" portion of that particular rule are executed. The inference engine continues to execute actions for all applicable rules until no applicable rules remain. Note, however, that the actions for one rule may affect the data that is compared against the fact patterns for the other rules to determine their applicability. Accordingly, an inapplicable rule may become applicable after the inference engine executes the actions for another rule, and vice versa.

Multiple tools exist for developing an expert system. One exemplary expert system development tool that may be used in embodiments of the present invention is known as the C Language Integrated Production System (CLIPS). CLIPS may provide a language environment for the construction of a rule and may allow the expert system to be implemented using object-oriented programming techniques. CLIPS may be obtained from COSMIC (CLIPS Sales), University of Georgia, 382 East Broad Street, Athens, Ga. 30602.

As discussed in the foregoing, the job post site expert system engine module 86 may be used to identify job post sites that satisfy one or more job post site selection criterion and to rank those identified job post sites. Three exemplary job post site selection criterion that may be used in accordance with the present invention are a geographic location criterion, a skill set criterion, and a job post site performance criterion. The geographic location criterion may specify the desired coverage for the job post site. That is, whether the job post site serves a local, statewide, regional, national, or worldwide audience. The skill set criterion may be based on such criterion as education, experience, specific workplace skills, knowledge, etc. The job post site performance criterion may be indicative of a value of a job post site in acting as a source for candidates. This value may be based on the number of qualified candidates typically obtained through the job post site, the cost of advertising job openings on the job post site, the retention rate for candidates hired through the job post site, and/or combinations of these or other factors. In accordance with particular embodiments of the present invention, job post sites may be ranked based on one job post site selection criterion or based on a composite of multiple job post site selection criteria.

As shown in FIG. 3, the job post site expert system engine module 86 may include a geographic location inference engine 94, a skill set inference engine 96, a geographic location fact table 98, and a skill set fact table 102. The geographic location inference engine 94 may use a geographic location criterion as input data to be compared against fact patterns in the geographic location fact table 98 to identify job post sites that satisfy the geographic location criterion. The geographic location inference engine 94 may rank the identified job post sites that satisfy the geographic location criterion based on the geographic location criterion (e.g., rank job post sites based on proximity to employer), or, alternatively, may use the job post site performance fact table 104 to rank the identified job post sites based on their performance. The job post site performance fact table 104 may be populated using data contained in the job post site performance data repository 32, which may be accessed by the data processing system 24 directly or through network 34 (see FIG. 1). Similarly, the skill set inference engine 96 may use a skill set criterion as input data to be compared against fact patterns in the skill set fact table 102 to identify job post sites that satisfy the skill set criterion. The skill set inference engine 96 may rank the identified job post sites that satisfy the skill set criterion based on the skill set criterion, or, alternatively, may use the job post site performance fact table 104 to rank the identified job post sites based on their performance.

The job post site posting module 88 may be configured to post or send a job opening description to one or more job post sites. The job post site posting module 88 may include a transport module 106 that is used to implement the communication protocol (e.g., File Transfer Protocol (FTP), electronic mail, or Transmission Control Protocol/Internet Protocol (TCP/IP)) used to transmit a job opening description to a job post site. In addition, the job post site posting module 88 may include a site format module 108 that may be used to convert a job opening description into a format that is compatible with a job post site before the job opening description is transmitted to the job post site by the transport module 106.

Finally, the job post site selection module 92 may be configured to coordinate operations of the job post site expert system engine module 86 and the job post site posting module 88. Furthermore, the job post site selection module 92 may be used to coordinate and/or perform additional processing on the job post site rankings provided by the job post site expert system engine 86. An example of such processing may involve combining lists of job post sites that have been ranked using different job post site selection criterion into a single ranked list of job post sites. Another example of such processing may involve presenting one or more ranked lists of job post sites to an end user to allow the end user to select those job post sites to which a job opening description is to be posted.

While FIG. 3 illustrates an exemplary software architecture that may facilitate selecting a job post site and/or posting of a job opening description to a job post site, it will be understood that the present invention is not limited to such a configuration but is intended to encompass any configuration capable of carrying out the operations described herein.

Computer program code for carrying out operations of the respective program modules may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage. Various divisions of functionality may be used while still benefiting from the teachings of the present invention. For example, the computer program code may execute entirely on a data processing system(s) that is configured to select a job post site and/or post a job opening description to a job post site. Alternatively, the computer program code may execute partly on a data processing system(s) configured to select a job post site and/or post a job opening description to a job post site and partly on a remote computer(s) or data processing system(s) that is configured to generate job opening description(s) (e.g., an employer's or end user's data processing system).

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
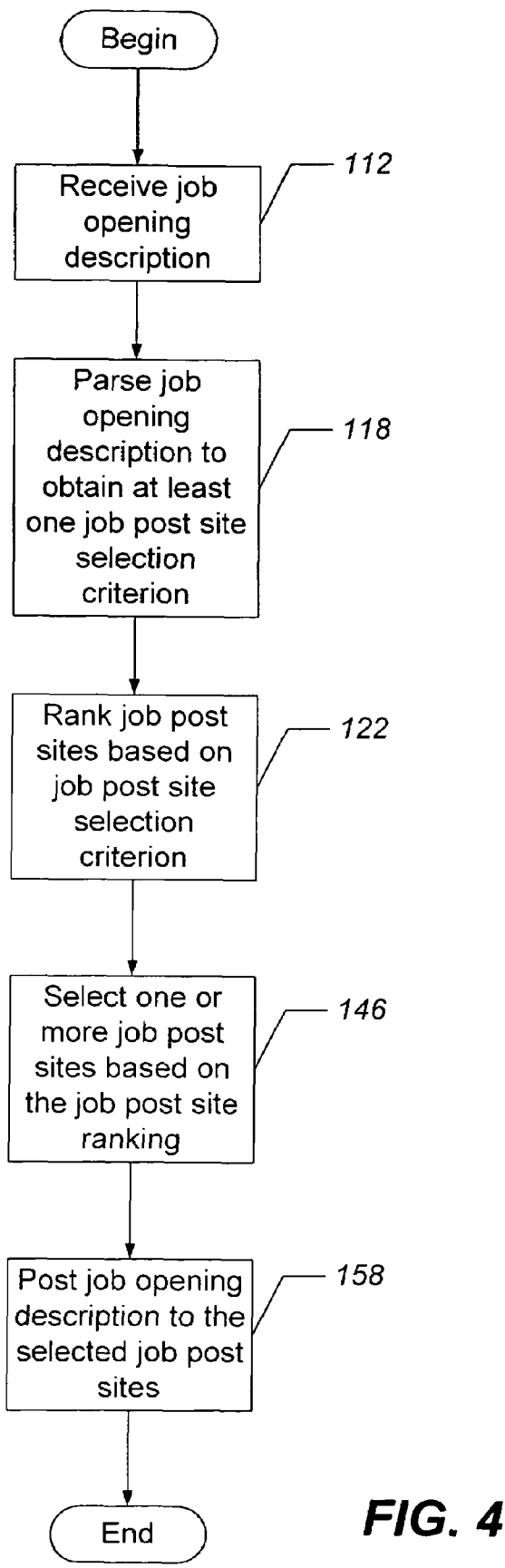
FIGS. 4-10 are flow charts that illustrate exemplary operations of methods, systems, and computer program products for selecting a job post site and/or posting a job opening description to a job post site in accordance with embodiments of the present invention.

With reference to the flowchart of FIG. 4 and the architectural block diagrams of FIGS. 1 and 3, exemplary operations of methods, systems, and computer program products for selecting a job post site and/or posting a job opening description to a job post site, in accordance with embodiments of the present invention, will be described hereafter. Operations begin at block 112 where a calling application on an employer's or end user's computer 26 generates a job opening description that is transmitted to and received at the data processing system 24. In accordance with particular embodiments illustrated in FIG. 5, the calling application program on the employer's computer 26 is part of a distributed object-oriented software system that is supported, for example, by the distributed object interface module 84 running on the data processing system 24.

Figure 5:
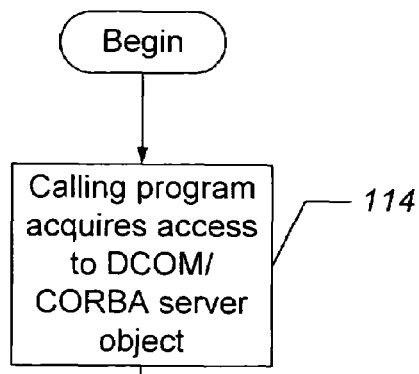
Figure 5:
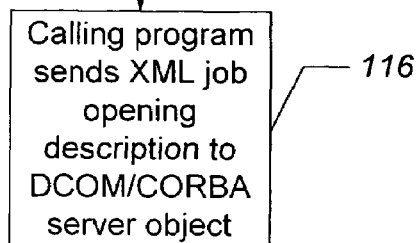

The calling application running on the employer's computer 26 may, therefore, be viewed as a client object while the distributed object interface module 84 may be viewed as a server object. For example, as illustrated in FIG. 5, the calling application (i.e., client object) may acquire access to the methods of a server object (e.g., a DCOM, CORBA, or Java RMI server object) at block 114 as discussed hereinabove with respect to the distributed object interface 84 of FIG. 3. At block 116, the calling application may send the job opening description to the data processing system 24 through invocation of one or more server object methods on the data processing system 24. The job opening description may be encoded as an XML stream to facilitate extraction of data from the job opening description by the job opening description parser module 82.

Returning to FIG. 4, the job opening description parser module 82 parses the received job opening description at block 118 to obtain one or more job post site selection criterion from the job opening description. For example, two job post site selection criterion that may be obtained from the job opening description are a geographic location criterion and a skill set criterion. As discussed hereinabove, the geographic location criterion may specify the desired coverage for the job post site (e.g., local, statewide, regional, national, or worldwide coverage). The skill set criterion may be based on such criterion as education, experience, specific workplace skills, knowledge, etc.

Figure 6:
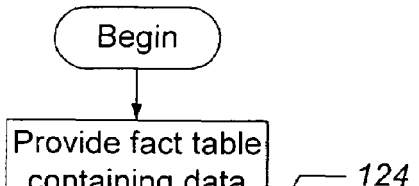
Figure 6:
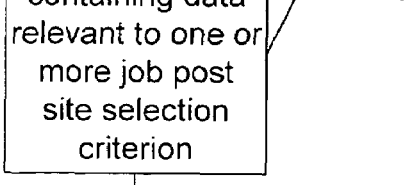

At block 122, the job post site expert system engine may rank multiple job post sites based on the job post site selection criterion obtained from the job opening description and/or other selection criterion, such as a job post site performance criterion. The ranking of the job post sites may indicate which job post sites may be most effective in recruiting candidates for the job opening(s) described in the job opening description. FIG. 6 illustrates embodiments for ranking multiple job post sites based on one or more job post site selection criterion. Specifically, an expert system may be used in which a fact table is provided at block 124 that contains fact pattern data relevant to one or more job post site selection criterion.

An inference engine may then be used to rank the job post sites at block 126 by applying rules to the fact table and to the one or more job post site selection criterion.

Figure 7:
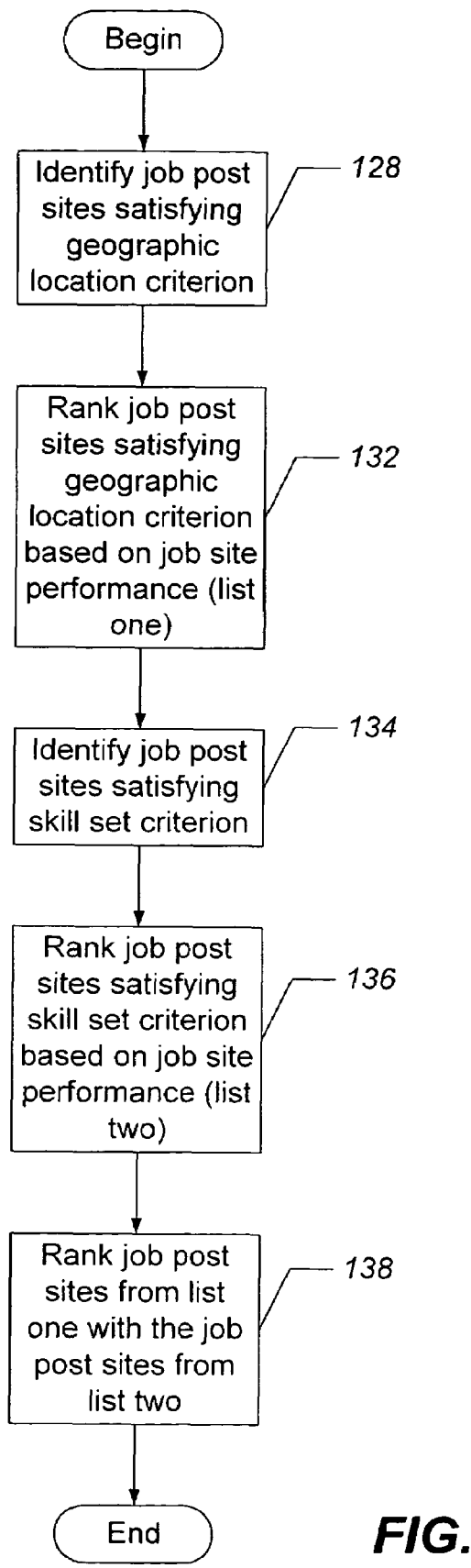

Alternative embodiments for ranking multiple job post sites in which the rankings are based on a geographic location criterion, a skill set criterion, and a job site performance criterion are illustrated in FIG. 7. At block 128, the geographic location inference engine 94 applies rules to the geographic location criterion and the geographic location fact table 98 to identify those job post sites that satisfy the geographic location criterion. For example, the geographic location criterion may be the southeastern United States. The geographic location inference engine 94 would then use the geographic location fact table 98 to identify those job post sites whose audience includes the southeastern United States. Operations continue at block 132 where the geographic location inference engine 94 ranks those job post sites satisfying the geographic location criterion based on a job site performance criterion.

Accordingly, the geographic location inference engine 94 may apply rules to a job post site performance criterion and the job post site performance fact table 104 to rank those job post sites that satisfy the geographic location criterion based on the job post site performance criterion. Note that the job post site performance criterion is typically predetermined based on a preferred standard for evaluating the value or effectiveness of a job post site. It is envisioned, however, that the job post site performance criterion may also be specified in a job opening description and, therefore, may be extracted from the job opening description at block 118 of FIG. 4. Thus, the geographic inference engine 94 may generate a list of job post sites that satisfy the geographic location criterion and are ranked by performance. For convenience, this list may be referred to herein as "list one."

The operations of blocks 128 and 132 are similarly performed by the skill set inference engine 96 using the skill set fact table 102 and the skill set criterion at blocks 134 and 136, respectively. Specifically, at block 134, the skill set inference engine 96 applies rules to the skill set criterion and the skill set fact table 102 to identify those job post sites that satisfy the skill set criterion. For example, the skill set criterion may be a college degree in accounting and ten years experience as a certified public accountant. The skill set inference engine 96 would then use the skill set fact table 102 to identify those job post sites whose audience includes experienced accountants. Operations continue at block 136 where the skill set inference engine 96 ranks those job post sites satisfying the skill set criterion based on a job site performance criterion.

Accordingly, the skill set inference engine 96 may apply rules to a job post site performance criterion and the job post site performance fact table 104 to rank those job post sites that satisfy the skill set criterion based on the job post site performance criterion. Thus, the skill set inference engine 96 may generate a list of job post sites that satisfy the skill set criterion and are ranked by performance. For convenience, this list may be referred to herein as "list two."

Figure 8:
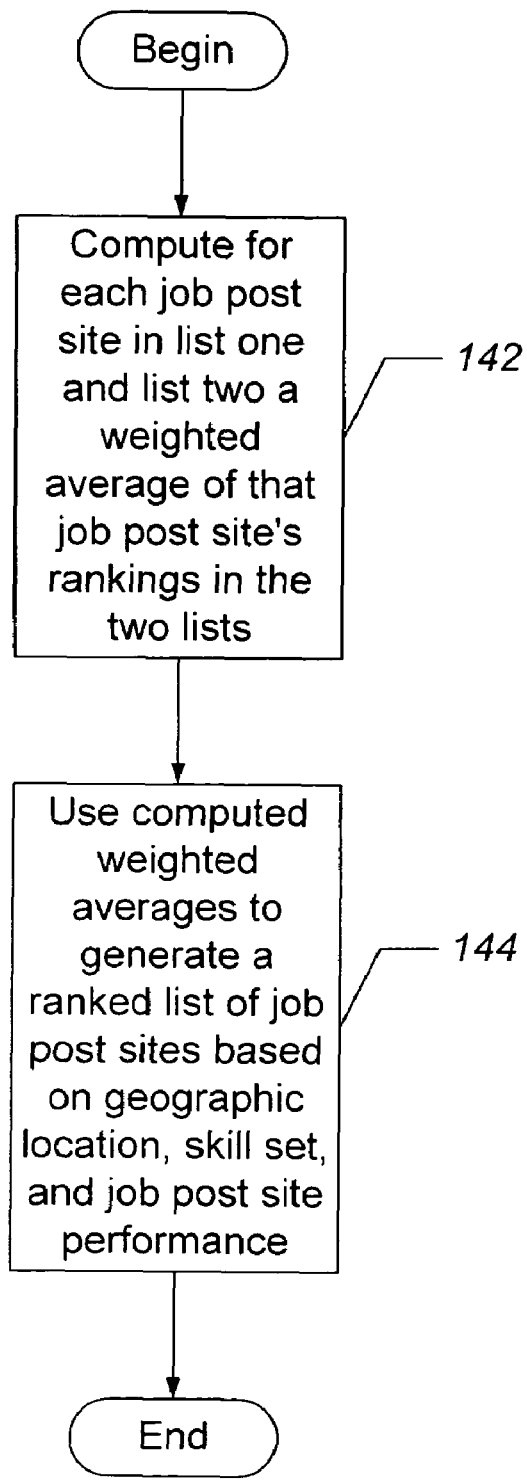

Next, at block 138, the job post site selection module 92 combines list one (i.e., the rankings of those job post sites satisfying the geographic location criterion based on the job site performance criterion) with list two (i.e., the rankings of those job post sites satisfying the skill set criterion based on the job site performance criterion) to generate a single ranked list of job post sites that takes into account the geographic location criterion, the skill set criterion, and the job post site performance criterion. FIG. 8 illustrates exemplary operations for generating this single ranked list based on list one and list two. Weights may be assigned to the rankings in list one and list two based on the relative importance of the geographic location criterion versus the skill set criterion. At block 142, the job post site selection module 92 may compute a weighted average for each job post site in list one and list two based on the assigned weights. For example, an employer may value the skill set criterion at twice the value of the geographic location criterion. In this case, a job post site's ranking in list two is multiplied by two and added to that job post site's ranking in list one. This sum is then divided by three to obtain a weighted average ranking for that job post site. Note also that the weights assigned to the rankings in the two lists may be identical in which case a job post site's ranking corresponds to its average rank in the two lists. The job post site selection module 92 may then use these computed weighted averages to generate a ranked list of job post sites based on geographic location, skill set, and job post site performance at block 144. The weights assigned to the ranked lists of job post sites based on the individual job post site selection criteria may be set according to an employer's or end user's preferences.

Figure 9:
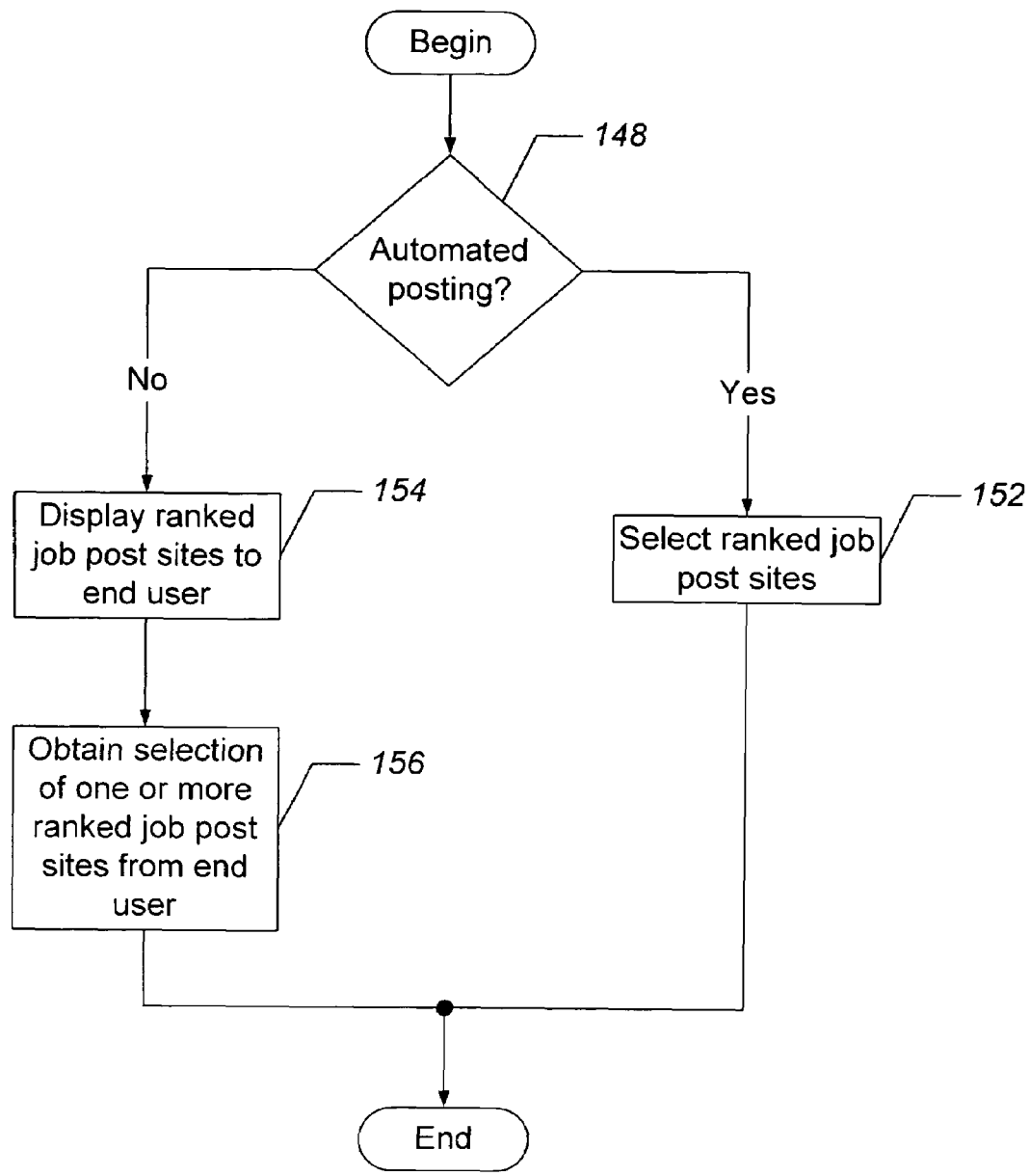

Returning to FIG. 4, once the job post sites have been ranked, one or more of the job post sites may be selected to receive the job opening description for posting at block 146. FIG. 9 illustrates exemplary operations for selecting those job post sites that are to receive the job opening description for posting. A determination is made by the job post site selection module 92 at block 148 whether the job opening description is to be posted to the job post site(s) as part of an automated batch job. If an employer has requested automated posting, then the job post site selection module 92 may select all ranked job post sites or all ranked job post sites whose ranking satisfies a predetermined threshold, such as the highest ranked job post sites up to a predetermined number of job post sites, at block 152. Alternatively, if an employer has not requested automated posting, then at block 154 the job post site selection module 92 may, through the distributed object interface module 84, send the ranked list of job post sites to the calling application on the employer's or end user's computer 26 to allow the employer or end user to select those job post sites to which the job opening description is to be submitted. The job post site selection module 92 may then receive the employer's selection of job post sites at block 156.

Figure 10:
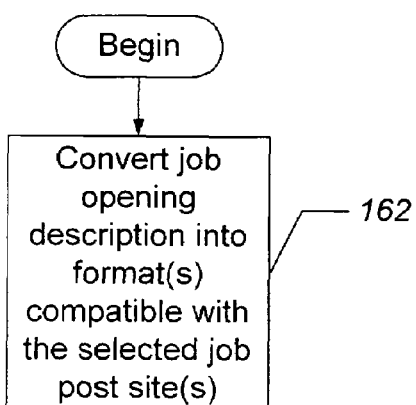

After one or more job post sites have been selected at block 146, the job post site posting module 88 may post the job opening description to the selected job post sites at block 158. FIG. 10 illustrates exemplary operations for posting the job opening description to the selected job post sites. Because different job post sites may impose different formatting standards on a job opening description, the job post site posting module 88 includes a site format module 108 that is configured to convert the job opening description into format(s) that are compatible with the selected job post site(s) at block 162. For example, the site format module 108 may create an object for each selected job post site that extracts information from the XML job opening description and places the data elements into a formatting template designed for job opening descriptions to be submitted to a specific job post site. The job post site posting module 88 may then record the job post in a logging database for reporting and/or retransmission purposes.

At block 164, the job post site posting module 88 may send the formatted job opening description to the selected job post site(s). More specifically, the job post site posting module may include a transport module 106 that creates an object for transmitting the formatted job opening description to each selected job post site. For job post sites that require or prefer a single batch of job opening descriptions to be contained one file, the job post site posting module 88 may write the formatted job opening descriptions into a single posting file in a dynamic portion of the memory 74. This single posting file containing the job opening descriptions may then be scheduled for transmission at a suitable time. Alternatively, for job post sites that prefer or require that job opening descriptions be posted individually, the job post site posting module 88 may post the formatted job opening descriptions destined for those job post sites separately. The job opening description(s) may be transmitted using a communication protocol that is supported by the job post site to which the job opening description(s) are to be submitted. Examples of such communication protocols may include, but are not limited to, FTP, electronic mail, and TCP/IP. After transmission of a batch of job opening descriptions or a single job opening description to a job post site, the job post site posting module 88 may log a record of the transmission in the memory 74 for later analysis.

The flowcharts of FIGS. 4-10 show the architecture, functionality, and operation of exemplary implementations of the software and data used to select a job post site and/or post a job opening description to a job post site in accordance with the present invention. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 4-10. For example, two blocks shown in succession in FIGS. 4-10 may be executed substantially concurrently or the blocks may sometimes be executed in the reverse order, depending upon the functionality involved.

From the foregoing it can readily be seen that, in accordance with the present invention, an employer may define a job post site selection criterion that correlates with a specific type of job opening to select a job post site that may be more effective than other job post sites in recruiting employees for that specific type of job opening. Moreover, the present invention may be used to rank job post sites based on one or more job post site selection criterion. These ranked job post sites may be presented to an employer for review to allow the employer to select those job post sites to which a job opening description should be submitted. Alternatively, the present invention may automatically submit a job opening description to all job post sites that satisfy the one or more job post site selection criterion and/or a ranking threshold. Before submitting a job opening description to a job post site, however, the present invention may convert the job opening description into a format that is compatible with that job post site. As a result, an employer need not keep track of different formatting standards for job opening descriptions that may be used by various job post sites.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of selecting a job post site, comprising:
    obtaining at least one job post site selection criterion;
    automatically ranking a plurality of job post sites based on the at least one job post site selection criterion, comprising:
        accessing a fact table that contains data relevant to the at least one job post site selection criterion; and
        using an inference engine to process the at least one job post site selection criterion and the fact table to rank the plurality of job post sites based on the at least one job post site selection criterion;
    selecting the job post site from the plurality of job post sites based on the ranking of the plurality of job post sites; and
    combining the geographic location and job post site performance ranked list of job post sites with the skill set and job post site performance ranked list of job post sites to generate a geographic location, skill set, and job post site performance ranked list of job post sites,
    wherein obtaining the at least one job post site selection criterion comprises:
        obtaining a geographic location criterion;
        obtaining a skill set criterion; and
        obtaining a job post site performance criterion that is indicative of a value of a job post site in acting as a source for candidates,
    wherein automatically ranking the plurality of job post sites based on the at least one job post site selection criterion comprises:
        identifying job post sites of the plurality of job post sites that satisfy the geographic location criterion;
        ranking the identified job post sites that satisfy the geographic location criterion based on the job post site performance criterion to generate a geographic location and job post site performance ranked list of job post sites;
        identifying job post sites of the plurality of job post sites that satisfy the skill set criterion; and
        ranking the identified job post sites that satisfy the skill set criterion based on the job post site performance criterion to generate a skill set and job post site performance ranked list of job post sites, and
    wherein combining the geographic location and job post site performance ranked list of job post sites with the skill set and job post site performance ranked list of job post sites to generate the geographic location, skill set, and job post site performance ranked list of job post sites comprises:
        computing, for each respective job post site in the geographic location and job post site performance ranked list of job post sites and the skill set and job post site performance ranked list of job post sites, a weighted average using ranks assigned to the respective job post site in the geographic location and job post site performance ranked list of job post sites and the skill set and job post site performance ranked list of job post sites; and
        using the computed weighted averages to generate the geographic location, skill set, and job post site performance ranked list.

2. A method as recited in claim 1, wherein identifying job post sites of the plurality of job post sites that satisfy the geographic location criterion, and ranking the identified job post sites that satisfy the geographic location criterion based on the job post site performance criterion to generate the geographic location and job post site performance ranked list of job post sites comprise:
    accessing a geographic location fact table that contains data relevant to the geographic location criterion;
    accessing a job post site performance fact table that contains data relevant to the job post site performance criterion;
    using an inference engine to process the geographic location criterion and the geographic location fact table to identify the job post sites of the plurality of job post sites that satisfy the geographic location criterion; and using the inference engine to process the identified job post sites that satisfy the geographic location criterion, the job post site performance criterion, and the job post site performance fact table to rank the identified job post sites that satisfy the geographic location criterion based on the job post site performance criterion.

3. A method as recited in claim 1, wherein identifying job post sites of the plurality of job post sites that satisfy the skill set criterion, and ranking the identified job post sites that satisfy the skill set criterion based on the job post site performance criterion to generate the skill set and job post site performance ranked list of job post sites comprise:

accessing a skill set fact table that contains data relevant to the skill set criterion;

accessing a job post site performance fact table that contains data relevant to the job post site performance criterion;

using an inference engine to process the skill set criterion and the skill set fact table to identify the job post sites of the plurality of job post sites that satisfy the skill set criterion; and using the inference engine to process the identified job post sites that satisfy the skill set criterion, the job post site performance criterion, and the job post site performance fact table to rank the identified job post sites that satisfy the skill set criterion based on the job post site performance criterion.

4. A method of selecting a job post site, comprising:

obtaining at least one job post site selection criterion;

automatically ranking a plurality of job post sites based on the at least one job post site selection criterion, comprising:

accessing a fact table that contains data relevant to the at least one job post site selection criterion; and using an inference engine to process the at least one job post site selection criterion and the fact table to rank the plurality of job post sites based on the at least one job post site selection criterion;

selecting the job post site from the plurality of job post sites based on the ranking of the plurality of job post sites; and combining the geographic location and job post site performance ranked list of job post sites with the skill set and job post site performance ranked list of job post sites to generate a geographic location, skill set, and job post site performance ranked list of job post sites, wherein obtaining the at least one job post site selection criterion comprises:

obtaining a geographic location criterion;

obtaining a skill set criterion; and obtaining a job post site performance criterion that is indicative of a value of a job post site in acting as a source for candidates, wherein automatically ranking the plurality of job post sites based on the at least one job post site selection criterion comprises:

identifying job post sites of the plurality of job post sites that satisfy the geographic location criterion;

ranking the identified job post sites that satisfy the geographic location criterion based on the job post site performance criterion to generate a geographic location and job post site performance ranked list of job post sites;

identifying job post sites of the plurality of job post sites that satisfy the skill set criterion; and ranking the identified job post sites that satisfy the skill set criterion based on the job post site performance criterion to generate a skill set and job post site performance ranked list of job post sites, and wherein combining the geographic location and job post site performance ranked list of job post sites with the skill set and job post site performance ranked list of job post sites to generate the geographic location, skill set, and job post site performance ranked list of job post sites comprises:

computing, for each respective job post site in the geographic location and job post site performance ranked list of job post sites and the skill set and job post site performance ranked list of job post sites, an average using ranks assigned to the respective job post site in the geographic location and job post site performance ranked list of job post sites and the skill set and job post site performance ranked list of job post sites; and using the computed averages to generate the geographic location, skill set, and job post site performance ranked list.

5. A method as recited in claim 4, wherein identifying job post sites of the plurality of job post sites that satisfy the geographic location criterion, and ranking the identified job post sites that satisfy the geographic location criterion based on the job post site performance criterion to generate the geographic location and job post site performance ranked list of job post sites comprise:

accessing a geographic location fact table that contains data relevant to the geographic location criterion;

accessing a job post site performance fact table that contains data relevant to the job post site performance criterion;

using an inference engine to process the geographic location criterion and the geographic location fact table to identify the job post sites of the plurality of job post sites that satisfy the geographic location criterion; and using the inference engine to process the identified job post sites that satisfy the geographic location criterion, the job post site performance criterion, and the job post site performance fact table to rank the identified job post sites that satisfy the geographic location criterion based on the job post site performance criterion.

6. A method as recited in claim 4, wherein identifying job post sites of the plurality of job post sites that satisfy the skill set criterion, and ranking the identified job post sites that satisfy the skill set criterion based on the job post site performance criterion to generate the skill set and job post site performance ranked list of job post sites comprise:

accessing a skill set fact table that contains data relevant to the skill set criterion;

accessing a job post site performance fact table that contains data relevant to the job post site performance criterion;

using an inference engine to process the skill set criterion and the skill set fact table to identify the job post sites of the plurality of job post sites that satisfy the skill set criterion; and using the inference engine to process the identified job post sites that satisfy the skill set criterion, the job post site performance criterion, and the job post site performance fact table to rank the identified job post sites that satisfy the skill set criterion based on the job post site performance criterion.

7. A system for selecting a job post site, comprising:

means for obtaining at least one job post site selection criterion;

means for automatically ranking a plurality of job post sites based on the at least one job post site selection criterion, comprising:
  means for accessing a fact table that contains data relevant to the at least one job post site selection criterion; and
  means for using an inference engine to process the at least one job post site selection criterion and the fact table to rank the plurality of job post sites based on the at least one job post site selection criterion;
means for selecting the job post site from the plurality of job post sites based on the ranking of the plurality of job post sites; and
means for combining the geographic location and job post site performance ranked list of job post sites with the skill set and job post site performance ranked list of job post sites to generate a geographic location, skill set, and job post site performance ranked list of job post sites,
wherein the means for obtaining the at least one job post site selection criterion comprises:
  means for obtaining a geographic location criterion;
  means for obtaining a skill set criterion; and
  means for obtaining a job post site performance criterion that is indicative of a value of a job post site in acting as a source for candidates,
wherein the means for automatically ranking the plurality of job post sites based on the at least one job post site selection criterion comprises:
  means for identifying job post sites of the plurality of job post sites that satisfy the geographic location criterion;
  means for ranking the identified job post sites that satisfy the geographic location criterion based on the job post site performance criterion to generate a geographic location and job post site performance ranked list of job post sites;
  means for identifying job post sites of the plurality of job post sites that satisfy the skill set criterion; and
  means for ranking the identified job post sites that satisfy the skill set criterion based on the job post site performance criterion to generate a skill set and job post site performance ranked list of job post sites, and
wherein the means for combining the geographic location and job post site performance ranked list of job post sites with the skill set and job post site performance ranked list of job post sites to generate the geographic location, skill set, and job post site performance ranked list of job post sites comprises:
  means for computing, for each respective job post site in the geographic location and job post site performance ranked list of job post sites and the skill set and job post site performance ranked list of job post sites, a weighted average using ranks assigned to the respective job post site in the geographic location and job post site performance ranked list of job post sites and the skill set and job post site performance ranked list of job post sites; and
  means for using the computed weighted averages to generate the geographic location, skill set, and job post site performance ranked list.

8. A system as recited in claim 7, wherein the means for identifying job post sites of the plurality of job post sites that satisfy the geographic location criterion, and the means for ranking the identified job post sites that satisfy the geographic location criterion based on the job post site performance criterion to generate the geographic location and job post site performance ranked list of job post sites comprise:

means for accessing a geographic location fact table that contains data relevant to the geographic location criterion;
means for accessing a job post site performance fact table that contains data relevant to the job post site performance criterion;
means for using an inference engine to process the geographic location criterion and the geographic location fact table to identify the job post sites of the plurality of job post sites that satisfy the geographic location criterion; and
means for using the inference engine to process the identified job post sites that satisfy the geographic location criterion, the job post site performance criterion, and the job post site performance fact table to rank the identified job post sites that satisfy the geographic location criterion based on the job post site performance criterion.

9. A system as recited in claim 7, wherein the means for identifying job post sites of the plurality of job post sites that satisfy the skill set criterion, and the means for ranking the identified job post sites that satisfy the skill set criterion based on the job post site performance criterion to generate the skill set and job post site performance ranked list of job post sites comprise:
  means for accessing a skill set fact table that contains data relevant to the skill set criterion;
  means for accessing a job post site performance fact table that contains data relevant to the job post site performance criterion;
  means for using an inference engine to process the skill set criterion and the skill set fact table to identify the job post sites of the plurality of job post sites that satisfy the skill set criterion; and
means for using the inference engine to process the identified job post sites that satisfy the skill set criterion, the job post site performance criterion, and the job post site performance fact table to rank the identified job post sites that satisfy the skill set criterion based on the job post site performance criterion.

10. A system for selecting a job post site, comprising:
  means for obtaining at least one job post site selection criterion;
  means for automatically ranking a plurality of job post sites based on the at least one job post site selection criterion, comprising:
    means for accessing a fact table that contains data relevant to the at least one job post site selection criterion; and
    means for using an inference engine to process the at least one job post site selection criterion and the fact table to rank the plurality of job post sites based on the at least one job post site selection criterion;
  means for selecting the job post site from the plurality of job post sites based on the ranking of the plurality of job post sites; and
  means for combining the geographic location and job post site performance ranked list of job post sites with the skill set and job post site performance ranked list of job post sites to generate a geographic location, skill set, and job post site performance ranked list of job post sites,
  wherein the means for obtaining the at least one job post site selection criterion comprises:
    means for obtaining a geographic location criterion,
    means for obtaining a skill set criterion; and
    means for obtaining a job post site performance criterion that is indicative of a value of a job post site in acting as a source for candidates, wherein the means for automatically ranking the plurality of job post sites based on the at least one job post site selection criterion comprises:
  means for identifying job post sites of the plurality of job post sites that satisfy the geographic location criterion;
  means for ranking the identified job post sites that satisfy the geographic location criterion based on the job post site performance criterion to generate a geographic location and job post site performance ranked list of job post sites;
  means for identifying job post sites of the plurality of job post sites that satisfy the skill set criterion; and
means for ranking the identified job post sites that satisfy the skill set criterion based on the job post site performance criterion to generate a skill set and job post site performance ranked list of job post sites, and
wherein the means for combining the geographic location and job post site performance ranked list of job post sites with the skill set and job post site performance ranked list of job post sites to generate the geographic location, skill set, and job post site performance ranked list of job post sites comprises:
  means for computing, for each respective job post site in the geographic location and job post site performance ranked list of job post sites and the skill set and job post site performance ranked list of job post sites, an average using ranks assigned to the respective job post site in the geographic location and job post site performance ranked list of job post sites and the skill set and job post site performance ranked list of job post sites; and
  means for using the computed averages to generate the geographic location, skill set, and job post site performance ranked list.

11. A system as recited in claim 10, wherein the means for identifying job post sites of the plurality of job post sites that satisfy the geographic location criterion, and the means for ranking the identified job post sites that satisfy the geographic location criterion based on the job post site performance criterion to generate the geographic location and job post site performance ranked list of job post sites comprise:
  means for accessing a geographic location fact table that contains data relevant to the geographic location criterion;
  means for accessing a job post site performance fact table that contains data relevant to the job post site performance criterion;
  means for using an inference engine to process the geographic location criterion and the geographic location fact table to identify the job post sites of the plurality of job post sites that satisfy the geographic location criterion; and
  means for using the inference engine to process the identified job post sites that satisfy the geographic location criterion, the job post site performance criterion, and the job post site performance fact table to rank the identified job post sites that satisfy the geographic location criterion based on the job post site performance criterion.

12. A system as recited in claim 10, wherein the means for identifying job post sites of the plurality of job post sites that satisfy the skill set criterion, and the means for ranking the identified job post sites that satisfy the skill set criterion based on the job post site performance criterion to generate the skill set and job post site performance ranked list of job post sites comprise:
  means for accessing a skill set fact table that contains data relevant to the skill set criterion;
  means for accessing a job post site performance fact table that contains data relevant to the job post site performance criterion;
  means for using an inference engine to process the skill set criterion and the skill set fact table to identify the job post sites of the plurality of job post sites that satisfy the skill set criterion; and
  means for using the inference engine to process the identified job post sites that satisfy the skill set criterion, the job post site performance criterion, and the job post site performance fact table to rank the identified job post sites that satisfy the skill set criterion based on the job post site performance criterion.

13. A computer program product for selecting a job post site, comprising:
  a computer readable storage medium having computer readable program code embodied therein, the computer readable program code comprising:
    computer readable program code for obtaining at least one job post site selection criterion;
    computer readable program code for automatically ranking a plurality of job post sites based on the at least one job post site selection criterion, comprising:
      computer readable program code for accessing a fact table that contains data relevant to the at least one job post site selection criterion; and
      computer readable program code for using an inference engine to process the at least one job post site selection criterion and the fact table to rank the plurality of job post sites based on the at least one job post site selection criterion;
    computer readable program code for combining the geographic location and job post site performance ranked list of job post sites with the skill set and job post site performance ranked list of job post sites to generate a geographic location, skill set, and job post site performance ranked list of job post sites; and
    computer readable program code for selecting the job post site from the plurality of job post sites based on the ranking of the plurality of job post sites,
    wherein the computer readable program code for obtaining the at least one job post site selection criterion comprises:
      computer readable program code for obtaining a geographic location criterion;
      computer readable program code for obtaining a skill set criterion; and
      computer readable program code for obtaining a job post site performance criterion that is indicative of a value of a job post site in acting as a source for candidates,
    wherein the computer readable program code for automatically ranking the plurality of job post sites based on the at least one job post site selection criterion comprises:
      computer readable program code for identifying job post sites of the plurality of job post sites that satisfy the geographic location criterion;
      computer readable program code for ranking the identified job post sites that satisfy the geographic location criterion based on the job post site performance criterion to generate a geographic location and job post site performance ranked list of job post sites;

computer readable program code for identifying job post sites of the plurality of job post sites that satisfy the skill set criterion; and computer readable program code for ranking the identified job post sites that satisfy the skill set criterion based on the job post site performance criterion to generate a skill set and job post site performance ranked list of job post sites, and wherein the computer readable program code for combining the geographic location and job post site performance ranked list of job post sites with the skill set and job post site performance ranked list of job post sites to generate the geographic location, skill set, and job post site performance ranked list of job post sites comprises:

computer readable program code for computing, for each respective job post site in the geographic location and job post site performance ranked list of job post sites and the skill set and job post site performance ranked list of job post sites, a weighted average using ranks assigned to the respective job post site in the geographic location and job post site performance ranked list of job post sites and the skill set and job post site performance ranked list of job post sites; and computer readable program code for using the computed weighted averages to generate the geographic location, skill set, and job post site performance ranked list.

14. A computer program product as recited in claim 13, wherein the computer readable program code for identifying job post sites of the plurality of job post sites that satisfy the geographic location criterion, and the computer readable program code for ranking the identified job post sites that satisfy the geographic location criterion based on the job post site performance criterion to generate the geographic location and job post site performance ranked list of job post sites comprise:

computer readable program code for accessing a geographic location fact table that contains data relevant to the geographic location criterion;

computer readable program code for accessing a job post site performance fact table that contains data relevant to the job post site performance criterion;

computer readable program code for using an inference engine to process the geographic location criterion and the geographic location fact table to identify the job post sites of the plurality of job post sites that satisfy the geographic location criterion; and computer readable program code for using the inference engine to process the identified job post sites that satisfy the geographic location criterion, the job post site performance criterion, and the job post site performance fact table to rank the identified job post sites that satisfy the geographic location criterion based on the job post site performance criterion.

15. A computer program product as recited in claim 13, wherein the computer readable program code for identifying job post sites of the plurality of job post sites that satisfy the skill set criterion, and the computer readable program code for ranking the identified job post sites that satisfy the skill set criterion based on the job post site performance criterion to generate the skill set and job post site performance ranked list of job post sites comprise:

computer readable program code for accessing a skill set fact table that contains data relevant to the skill set criterion;

computer readable program code for accessing a job post site performance fact table that contains data relevant to the job post site performance criterion;

computer readable program code for using an inference engine to process the skill set criterion and the skill set fact table to identify the job post sites of the plurality of job post sites that satisfy the skill set criterion; and computer readable program code for using the inference engine to process the identified job post sites that satisfy the skill set criterion, the job post site performance criterion, and the job post site performance fact table to rank the identified job post sites that satisfy the skill set criterion based on the job post site performance criterion.

16. A computer program product for selecting a job post site, comprising:

a computer readable storage medium having computer readable program code embodied therein the computer readable program code comprising:

computer readable program code for obtaining at least one job post site selection criterion;

computer readable program code for automatically ranking a plurality of job post sites based on the at least one job post site selection criterion, comprising:

computer readable program code for accessing a fact table that contains data relevant to the at least one job post site selection criterion; and computer readable program code for using an inference engine to process the at least one job post site selection criterion and the fact table to rank the plurality of job post sites based on the at least one job post site selection criterion;

computer readable program code for combining the geographic location and job post site performance ranked list of job post sites with the skill set and job post site performance ranked list of job post sites to generate a geographic location, skill set, and job post site performance ranked list of job post sites; and computer readable program code for selecting the job post site from the plurality of job post sites based on the ranking of the plurality of job post sites, wherein the computer readable program code for obtaining the at least one job post site selection criterion comprises:

computer readable program code for obtaining a geographic location criterion;

computer readable program code for obtaining a skill set criterion; and computer readable program code for obtaining a job post site performance criterion that is indicative of a value of a job post site in acting as a source for candidates, wherein the computer readable program code for automatically ranking the plurality of job post sites based on the at least one job post site selection criterion comprises:

computer readable program code for identifying job post sites of the plurality of job post sites that satisfy the geographic location criterion;

computer readable program code for ranking the identified job post sites that satisfy the geographic location criterion based on the job post site performance criterion to generate a geographic location and job post site performance ranked list of job post sites;

computer readable program code for identifying job post sites of the plurality of job post sites that satisfy the skill set criterion; and computer readable program code for ranking the identified job post sites that satisfy the skill set criterion based on the job post site performance criterion to generate a skill set and job post site performance ranked list of job post sites and wherein the computer readable program code for combining the geographic location and job post site performance ranked list of job post sites with the skill set and job post site performance ranked list of job post sites to generate the geographic location, skill set, and job post site performance ranked list of job post sites comprises:

computer readable program code for computing, for each respective job post site in the geographic location and job post site performance ranked list of job post sites and the skill set and job post site performance ranked list of job post sites, an average using ranks assigned to the respective job post site in the geographic location and job post site performance ranked list of job post sites and the skill set and job post site performance ranked list of job post sites; and computer readable program code for using the computed averages to generate the geographic location, skill set, and job post site performance ranked list.

17. A computer program product as recited in claim 16, wherein the computer readable program code for identifying job post sites of the plurality of job post sites that satisfy the geographic location criterion, and the computer readable program code for ranking the identified job post sites that satisfy the geographic location criterion based on the job post site performance criterion to generate the geographic location and job post site performance ranked list of job post sites comprise:

computer readable program code for accessing a geographic location fact table that contains data relevant to the geographic location criterion;

computer readable program code for accessing a job post site performance fact table that contains data relevant to the job post site performance criterion;

computer readable program code for using an inference engine to process the geographic location criterion and the geographic location fact table to identify the job post sites of the plurality of job post sites that satisfy the geographic location criterion; and computer readable program code for using the inference engine to process the identified job post sites that satisfy the geographic location criterion, the job post site performance criterion, and the job post site performance fact table to rank the identified job post sites that satisfy the geographic location criterion based on the job post site performance criterion.

18. A computer program product as recited in claim 16, wherein the computer readable program code for identifying job post sites of the plurality of job post sites that satisfy the skill set criterion, and the computer readable program code for ranking the identified job post sites that satisfy the skill set criterion based on the job post site performance criterion to generate the skill set and job post site performance ranked list of job post sites comprise:

computer readable program code for accessing a skill set fact table that contains data relevant to the skill set criterion;

computer readable program code for accessing a job post site performance fact table that contains data relevant to the job post site performance criterion;

computer readable program code for using an inference engine to process the skill set criterion and the skill set fact table to identify the job post sites of the plurality of job post sites that satisfy the skill set criterion; and computer readable program code for using the inference engine to process the identified job post sites that satisfy the skill set criterion, the job post site performance criterion, and the job post site performance fact table to rank the identified job post sites that satisfy the skill set criterion based on the job post site performance criterion.

\* \* \* \* \*